(12) United States Patent
Park et al.

(10) Patent No.: US 12,513,300 B2
(45) Date of Patent: Dec. 30, 2025

(54) METHOD AND APPARATUS FOR VIDEO DECODING AND VIDEO ENCODING USING A PLURALITY OF CANDIDATE PREDICTION MOTION VECTORS

(71) Applicant: SAMSUNG ELECTRONICS CO., LTD., Suwon-si (KR)

(72) Inventors: Minsoo Park, Suwon-si (KR); Minwoo Park, Suwon-si (KR); Ilkoo Kim, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 536 days.

(21) Appl. No.: 17/984,063

(22) Filed: Nov. 9, 2022

(65) Prior Publication Data

US 2023/0145364 A1 May 11, 2023

Related U.S. Application Data

(63) Continuation of application No. PCT/KR2022/017321, filed on Nov. 7, 2022.

(30) Foreign Application Priority Data

Nov. 9, 2021 (KR) .................. 10-2021-0153307
Sep. 19, 2022 (KR) .................. 10-2022-0118151

(51) Int. Cl.
*H04N 19/137* (2014.01)
*H04N 19/105* (2014.01)
*H04N 19/176* (2014.01)

(52) U.S. Cl.
CPC ......... *H04N 19/137* (2014.11); *H04N 19/105* (2014.11); *H04N 19/176* (2014.11)

(58) Field of Classification Search
CPC .. H04N 19/105; H04N 19/137; H04N 19/176; H04N 19/52; H04N 19/577
See application file for complete search history.

(56) References Cited

U.S. PATENT DOCUMENTS 9,313,496 B2 4/2016 Miyoshi
10,462,457 B2 10/2019 Xu et al.
(Continued)

FOREIGN PATENT DOCUMENTS

JP 2014-143650 A 8/2014
JP 5711514 B2 4/2015
(Continued)

OTHER PUBLICATIONS

International Search Report & Written Opinion (PCT/ISA/210 & PCT/ISA/237) issued by the International Searching Authority on Feb. 15, 2023 in corresponding International Application No. PCT/KR2022/017321.

*Primary Examiner* — Jessica M Prince
(74) *Attorney, Agent, or Firm* — Sughrue Mion, PLLC

(57) ABSTRACT

Provided are a video decoding method and apparatus for obtaining, from a bitstream, information about a first motion vector of a current block, determining, based on the information about the first motion vector, the first motion vector, determining a candidate list including a plurality of candidate prediction motion vectors for determining a second motion vector of the current block, determining, based on a distance between each of the plurality of candidate prediction motion vectors and the first motion vector, one of the plurality of candidate prediction motion vectors as the second motion vector, and determining a motion vector of the current block by using the first motion vector and the second motion vector.

12 Claims, 15 Drawing Sheets

(56) References Cited

U.S. PATENT DOCUMENTS

| | | |
|---|---|---|
| 10,893,291 B2 | 1/2021 | Hung et al. |
| 11,057,618 B2 | 7/2021 | Lim et al. |
| 11,523,130 B2 | 12/2022 | Jeong et al. |
| 11,558,623 B2 | 1/2023 | An et al. |
| 2018/0109805 A1 | 4/2018 | Takehara et al. |
| 2018/0199054 A1 | 7/2018 | Hsu |
| 2020/0236362 A1 | 7/2020 | Lee et al. |
| 2020/0275117 A1* | 8/2020 | Jeong ............ H04N 19/139 |
| 2020/0314444 A1 | 10/2020 | Lee et al. |
| 2022/0014730 A1 | 1/2022 | Jeong et al. |
| 2022/0150471 A1* | 5/2022 | Bae ............ H04N 19/105 |
| 2023/0239496 A1 | 7/2023 | Moon et al. |
| 2023/0353776 A1 | 11/2023 | Lee et al. |

FOREIGN PATENT DOCUMENTS

| | | |
|---|---|---|
| KR | 10-1652072 B1 | 8/2016 |
| KR | 10-2017-0078672 A | 7/2017 |
| KR | 10-2018-0061060 A | 6/2018 |
| KR | 10-2019-0038371 A | 4/2019 |
| KR | 10-2019-0142747 A | 12/2019 |
| KR | 10-2021-0029819 A | 3/2021 |
| KR | 10-2021-0030505 A | 3/2021 |
| KR | 10-2021-0091356 A | 7/2021 |
| KR | 10-2021-0118254 A | 9/2021 |

\* cited by examiner

Maximum CU     Tile     Slice

METHOD AND APPARATUS FOR VIDEO DECODING AND VIDEO ENCODING USING A PLURALITY OF CANDIDATE PREDICTION MOTION VECTORS

CROSS-REFERENCE TO RELATED APPLICATIONS

This application is a Continuation Application of International Application PCT/KR2022/017321 filed on Nov. 7, 2022, which claims benefit of Korean Patent Application No. 10-2021-0153307 filed on Nov. 9, 2021, at the Korean Intellectual Property Office and Korean Patent Application No. 10-2022-0118151 filed on Sep. 19, 2022, at the Korean Intellectual Property Office, the disclosures of which are incorporated herein in their entireties by reference.

BACKGROUND

1. Field

The disclosure relates to a video decoding method and apparatus, and a video encoding method and apparatus, and more particularly, to video decoding and encoding methods and apparatuses, by which, in bi-directional prediction, related information is transmitted with respect to only first motion vector information of two types of motion vector information (the first motion vector information and second motion vector information), and the second motion vector information is derived by using a first motion vector obtained by using the transmitted first motion vector information and a motion vector candidate list with respect to a second motion vector.

2. Description of Related Art

According to a codec, such as H. 264 advanced video coding (AVC), high efficiency video coding (HEVC), and versatile video coding (VVC), an image is split into blocks, and each block is prediction-encoded and prediction-decoded through inter prediction or intra prediction.

Intra prediction is a method of compressing an image by removing spatial redundancy in an image, and inter prediction is a method of compressing an image by removing temporal redundancy between images.

In an encoding process, a prediction block is generated through intra prediction or inter prediction, a residual block is generated by subtracting the prediction block from a current block, and residual samples of the residual block are transformed and quantized.

In a decoding process, residual samples of a residual block are generated by inverse quantizing and inverse transforming quantized transform coefficients of the residual block, and a current block is reconstructed by adding a prediction block generated through intra prediction or inter prediction to the residual block. The reconstructed current block may be processed according to a one or more filtering algorithms and then output.

According to a codec, such as H. 264 AVC, HEVC, and WVC, in the case of bi-directional prediction, motion information with respect to both directions may be received, and motion estimation may be performed twice to search for two reference blocks.

As the resolution of video transmitted in real time has been continually increased to 4K or 8K UHD or higher, a bi-directional prediction method that is preferable for real time transmission in terms of complexity may be required.

SUMMARY

According to an embodiment of the disclosure, a video decoding method includes obtaining, from a bitstream, information about a first motion vector of a current block, determining, based on the information about the first motion vector, the first motion vector, determining a candidate list including a plurality of candidate prediction motion vectors for determining a second motion vector of the current block, determining, based on a distance between each of the plurality of candidate prediction motion vectors and the first motion vector, one of the plurality of candidate prediction motion vectors as the second motion vector, and determining a motion vector of the current block by using the first motion vector and the second motion vector.

According to an embodiment of the disclosure, a video decoding apparatus includes a memory storing one or more instructions, and at least one processor configured to operate according to the one or more instructions. The at least one processor may be configured to obtain, from a bitstream, information about a first motion vector of a current block. The at least one processor may be configured to determine, based on the information about the first motion vector, the first motion vector. The at least one processor may be configured to determine a candidate list including a plurality of candidate prediction motion vectors for determining a second motion vector of the current block. The at least one processor may be configured to determine, based on a distance between each of the plurality of candidate prediction motion vectors and the first motion vector, one of the plurality of candidate prediction motion vectors as the second motion vector. The at least one processor may be configured to determine a motion vector of the current block by using the first motion vector and the second motion vector.

According to an embodiment of the disclosure, a video encoding method includes generating information about a first motion vector of a current block, determining the first motion vector, based on the information about the first motion vector, determining a candidate list including a plurality of candidate prediction motion vectors for determining a second motion vector of the current block, determining, based on a distance between each of the plurality of candidate prediction motion vectors and the first motion vector, one of the plurality of candidate prediction motion vectors as the second motion vector, and encoding the information about the first motion vector by determining a motion vector of the current block by using the first motion vector and the second motion vector.

According to an embodiment of the disclosure, an artificial intelligence (AI)-based video encoding apparatus includes a memory storing one or more instructions, and at least one processor configured to operate according to the one or more instructions. The at least one processor may be configured to generate information about a first motion vector of a current block. The at least one processor may be configured to determine, based on the information about the first motion vector, the first motion vector. The at least one processor may be configured to determine a candidate list including a plurality of candidate prediction motion vectors for determining a second motion vector of the current block. The at least one processor may be configured to determine, based on a distance between each of the plurality of candidate prediction motion vectors and the first motion vector, one of the plurality of candidate prediction motion vectors as the second motion vector. The at least one processor may be configured to encode the information about the first motion vector by determining a motion vector of the current block by using the first motion vector and the second motion vector.

DETAILED DESCRIPTION

Figure 1:
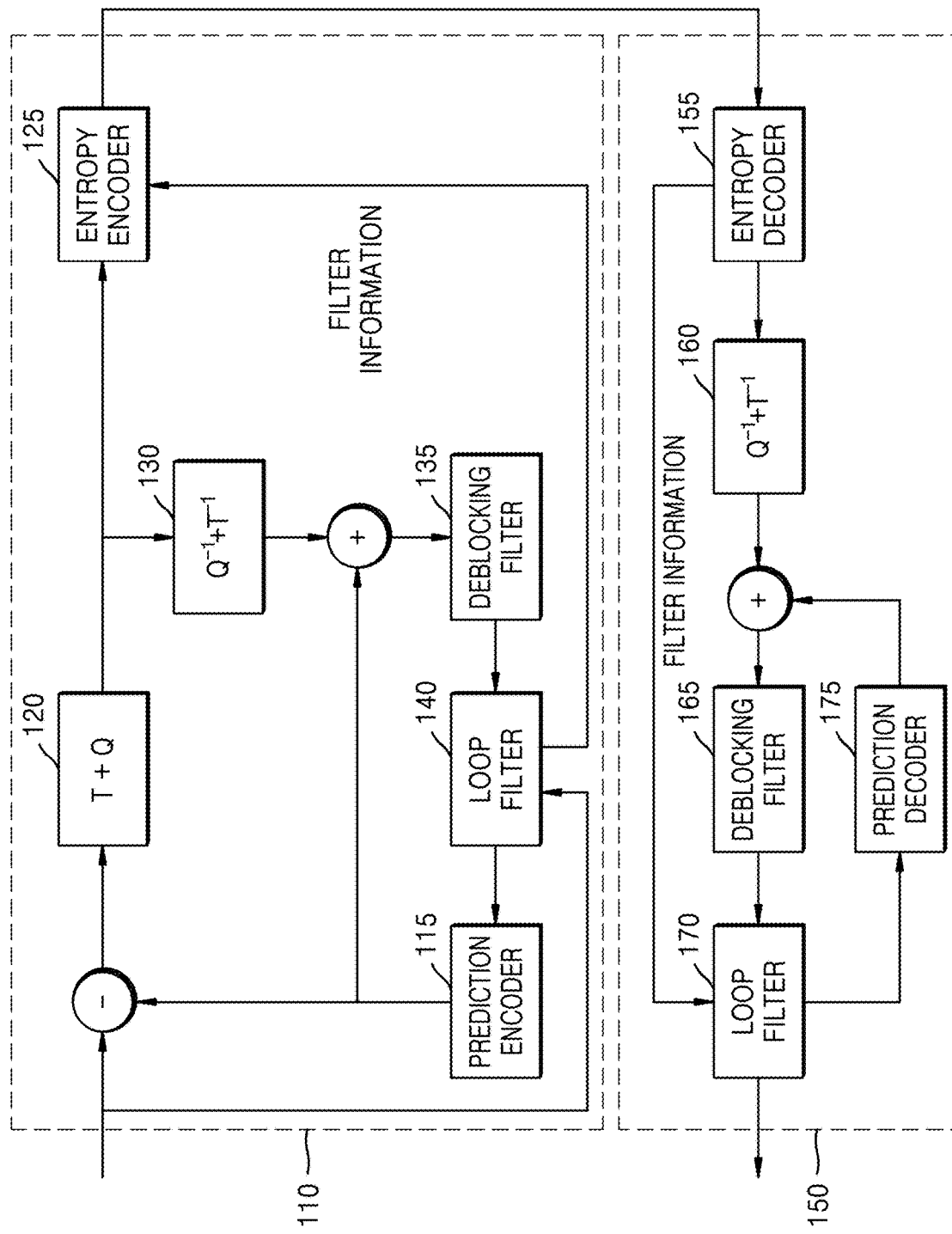
FIG. 1 is a diagram illustrating image encoding and decoding processes.

As the disclosure allows for various changes and numerous examples, particular embodiments of the disclosure will be illustrated in the drawings and described in detail in the written description. However, this is not intended to limit the disclosure to particular modes of practice, and it will be understood that all changes, equivalents, and substitutes that do not depart from the spirit and technical scope of various embodiments of the disclosure are encompassed in the disclosure.

In the description of an embodiment of the disclosure, certain detailed explanations of related art are omitted when it is deemed that they may unnecessarily obscure the essence of the disclosure. Also, numbers (for example, a first, a second, and the like) used in the description of the specification are merely identifier codes for distinguishing one element from another.

Also, in the disclosure, it will be understood that when elements are "connected" or "coupled" to each other, the elements may be directly connected or coupled to each other, but may alternatively be connected or coupled to each other with an intervening element therebetween, unless specified otherwise.

In the disclosure, regarding an element represented as a "unit" or a "module," two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the disclosure, an "image" or a "picture" may denote a still image (or a frame), a moving image including a plurality of consecutive still images, or a video.

Also, in the disclosure, a "current block" denotes a block that is currently subject to be processed. The current block may denote a slice, a tile, a largest coding unit, a coding unit, a prediction unit, or a transform unit split from a current image.

Also, in the disclosure, a "sample" denotes data assigned to a sampling position of data, such as an image or a block, i.e., data to be processed. For example, the sample may include a pixel of a two-dimensional image.

Before describing an image decoding method, an image decoding apparatus, an image encoding method, and an image encoding apparatus according to an embodiment of the disclosure, image encoding and decoding processes are described with reference to FIGS. 1 and 2.

FIG. 1 is a diagram illustrating processes of encoding and decoding an image.

An encoding apparatus 110 may transmit a bitstream generated by encoding an image to a decoding apparatus 150, and the decoding apparatus 150 may reconstruct the image by receiving and decoding the bitstream.

In detail, in the encoding apparatus 110, a prediction encoder 115 may output a prediction block through inter prediction and intra prediction, and a transformer and quantizer 120 may transform and quantize residual samples of a residual block between the prediction block and a current block and output a quantized transform coefficient. An entropy encoder 125 may output the quantized transform coefficient as a bitstream by encoding the quantized transform coefficient.

The quantized transform coefficient may be reconstructed as the residual block including the residual samples of a spatial domain through an inverse quantizer and inverse transformer 130. A reconstruction block combining the prediction block and the residual block may be output as a filtered block through a deblocking filter 135 and a loop filter 140. A reconstructed image including the filtered block may be used, by the prediction encoder 115, as a reference image of a next input image.

The bitstream received by the decoding apparatus 150 may be reconstructed as a residual block including residual samples of a spatial domain through an entropy decoder 155 and an inverse quantizer and inverse transformer 160. A reconstruction block may be generated by combining a prediction block output from a prediction decoder 175 with the residual block, and the reconstruction block may be output as a filtered block through a deblocking filter 165 and a loop filter 170. A reconstructed image including the filtered block may be used, by the prediction decoder 175, as a reference image with respect to a next image.

The loop filter 140 of the encoding apparatus 110 may perform loop filtering by using filter information input according to a user input or system setting. The filter information used by the loop filter 140 may be transmitted to the decoding apparatus 150 through the entropy encoder 125. The loop filter 170 of the decoding apparatus 150 may perform loop filtering based on filter information input from the entropy decoder 155.

In the image encoding and decoding processes, an image may be hierarchically split, and blocks split from the image may be encoded and decoded. A block split from an image is described with reference to FIG. 2.

Figure 2:
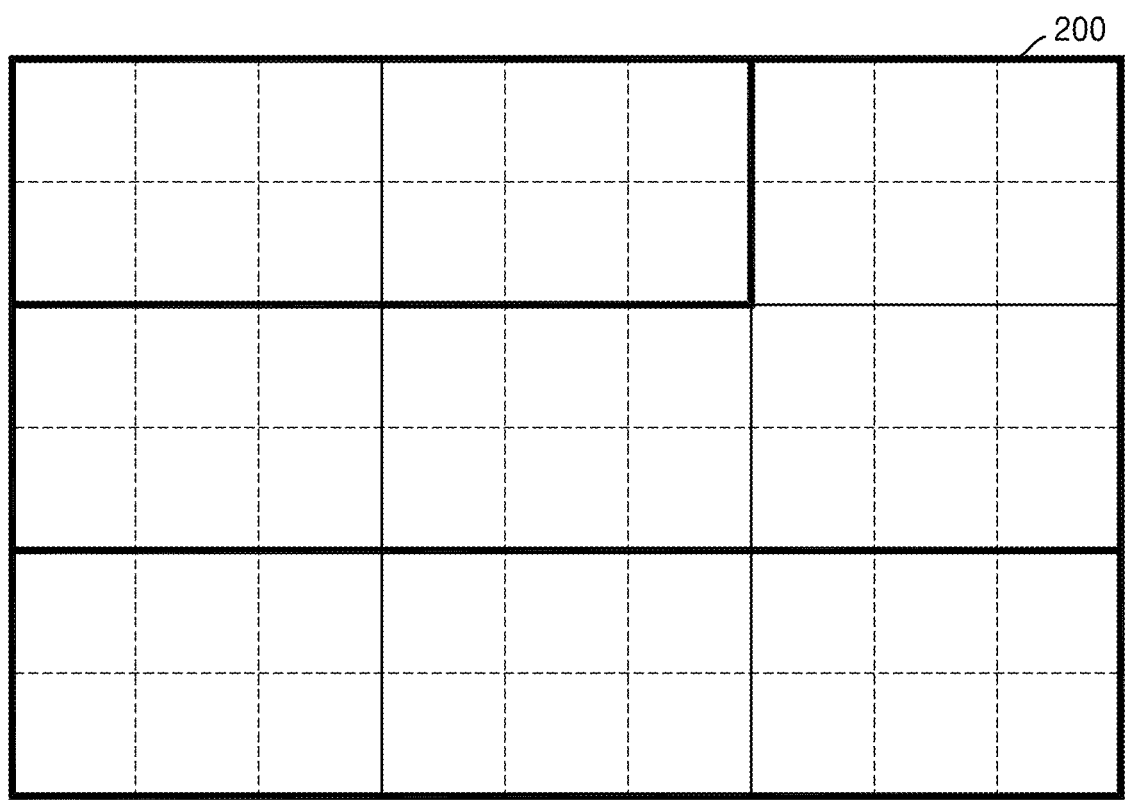
FIG. 2 is a diagram illustrating blocks split from an image according to a tree structure.
Figure 2:
Figure 2:
Figure 2:

FIG. 2 is a diagram illustrating blocks split from an image 200 according to a tree structure.

One image 200 may be split into one or more slices or one or more tiles. One slice may include a plurality of tiles.

One slice or one tile may be a sequence of one or more largest coding units (maximum coding units).

One largest coding unit may be split into one or more coding units. The coding unit may be a reference block for determining a prediction mode. In other words, whether to apply an intra prediction mode or an inter prediction mode to each coding unit may be determined. In the disclosure, the largest coding unit may be referred to as the largest coding block, and the coding unit may be referred to as the coding block.

A size of the coding unit may be the same as or less than the largest coding unit. The largest coding unit is a coding unit having a largest size, and thus, may also be referred to as the coding unit.

One or more prediction units for intra prediction or inter prediction may be determined from the coding unit. A size of the prediction unit may be the same as or less than the coding unit.

Also, one or more transform units for transformation and quantization may be determined from the coding unit. A size of the transform unit may be the same as or less than the coding unit. The transform unit may be a reference block for transformation and quantization, and residual samples of the coding unit may be transformed and quantized for each transform unit in the coding unit.

In the disclosure, a current block may denote a slice, a tile, a largest coding unit, a coding unit, a prediction unit, or a transform unit split from the image 200. Also, a sub-block of the current block may denote a block split from the current block. For example, when the current block is a largest coding unit, the sub-block may be a coding unit, a prediction unit, or a transform unit. Also, an upper block of the current block may denote a block including the current block as a portion of the upper block. For example, when the current block is a largest coding unit, the upper block may be a picture sequence, a picture, a slice, or a tile.

Hereinafter, a video decoding method, a video decoding apparatus, a video encoding method, and a video encoding apparatus according to an embodiment of the disclosure are described with reference to FIGS. 3A to 9.

Figure 3A:
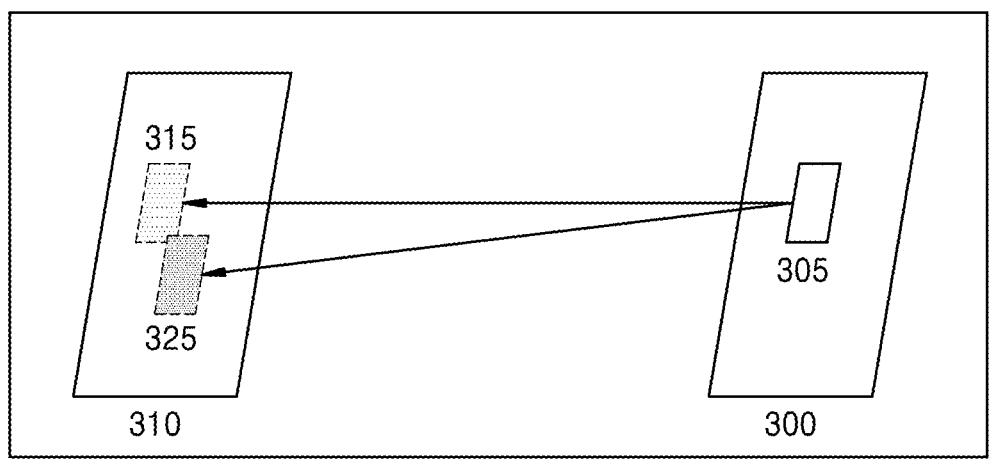
FIG. 3A is a diagram for describing an example of a reference block in bi-directional prediction.

FIG. 3A is a diagram for describing an example of a reference block in bi-directional prediction.

Referring to FIG. 3A, according to the bi-directional prediction, two reference blocks, that is, a first reference block 315 and a second reference block 325, may be obtained in a first reference frame 310, and a current block 305 in a current frame 300 may be predicted by using the first reference block 315 and the second reference block 325.

Figure 3B:
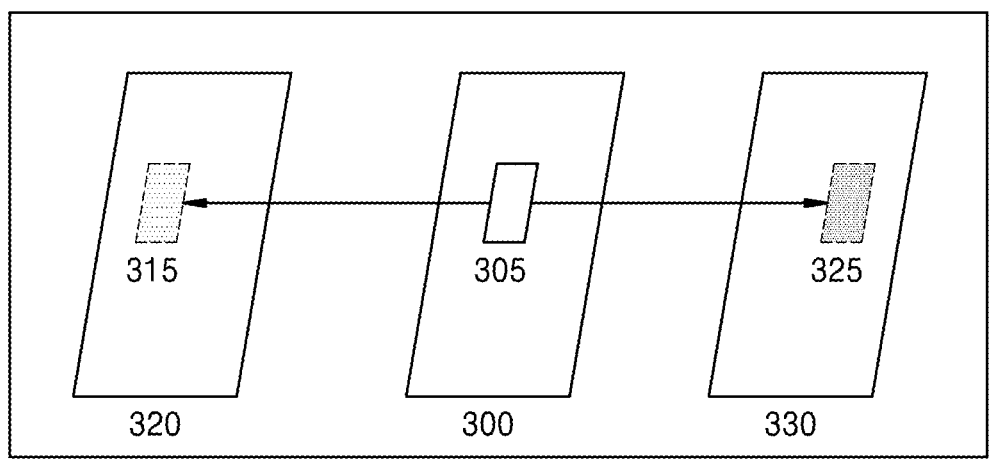
FIG. 3B is a diagram for describing an example of a reference block in bi-directional prediction.

FIG. 3B is a diagram for describing an example of a reference block in bi-directional prediction.

Referring to FIG. 3B, according to the bi-directional prediction, the first reference block 315 in a previous first reference frame 320 of the current frame 300 and the second reference block 325 in a future second reference frame 330 of the current frame 300 may be obtained, and the current block 305 in the current frame 300 may be predicted by using the first reference block 315 and the second reference block 325.

Figure 3C:
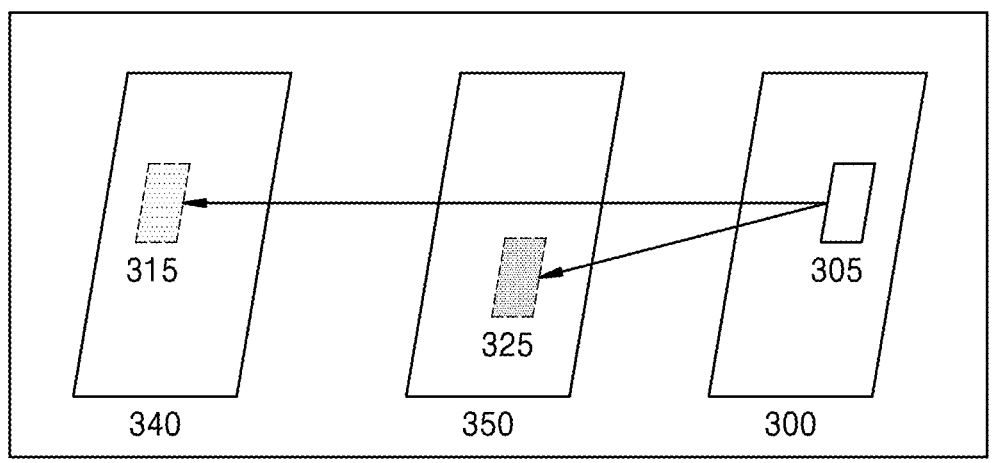
FIG. 3C is a diagram for describing an example of a reference block in bi-directional prediction.

FIG. 3C is a diagram for describing an example of a reference block in bi-directional prediction.

Referring to FIG. 3C, according to the bi-directional prediction, the first reference block 315 in a previous first reference frame 340 of the current frame 300 and the second reference block 325 in a previous second reference frame 350 of the current frame 300 may be obtained, and the current block 305 in the current frame 300 may be predicted by using the first reference block 315 and the second reference block 325.

Figure 3D:
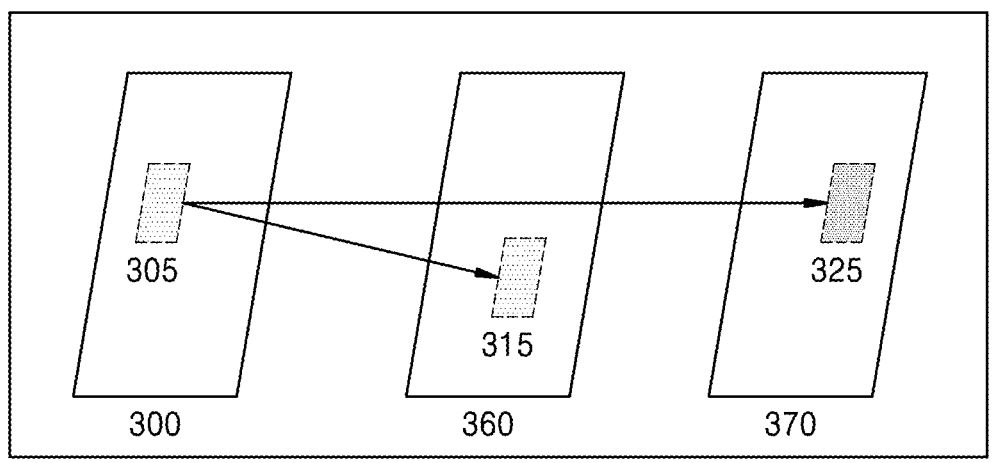
FIG. 3D is a diagram for describing an example of a reference block in bi-directional prediction.

FIG. 3D is a diagram for describing an example of a reference block in bi-directional prediction.

Referring to FIG. 3D, according to the bi-directional prediction, the first reference block 315 in a future first reference frame 360 of the current frame 300 and the second reference block 325 in a future second reference frame 370 of the current frame 300 may be obtained, and the current block 305 in the current frame 300 may be predicted by using the first reference block 315 and the second reference block 325.

Figure 3E:
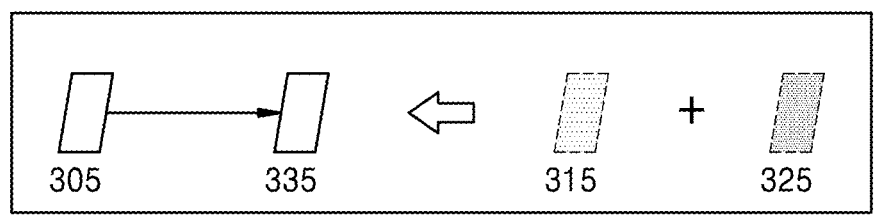
FIG. 3E is a diagram for describing a method of obtaining a current block by using a reference block in bi-directional prediction.

FIG. 3E is a diagram for describing a method of obtaining a current block by using a reference block in bi-directional prediction.

Referring to FIG. 3E, a reference image 335 may be obtained by using the first reference block 315 and the second reference block 325 obtained according to FIGS. 3A to 3D, and the reference image 335 may be determined as the current block 305.

According to FIGS. 3A to 3E, for a decoding end to obtain the reference image 335 by using the first reference block 315 and the second reference block 325, information about the first reference block 315 and the second reference block 325 may have to be transmitted. Information about a reference block may include information (for example, a reference index) about a reference frame including the reference block and position information (for example, a motion vector) of the reference block based on a position of the current block. For example, the motion vector may represent x-axis displacement and y-axis displacement based on a position of an upper left pixel of the current block as a unit of a predetermined fractional pixel or a predetermined integer pixel. Also, when transmitting the motion vector, a motion vector difference value, which is a difference between neighboring motion vector information and current motion vector information, may be transmitted, by using motion vector information of a neighboring block. Also, a motion vector prediction index with respect to information used when one of a plurality of pieces of neighboring block information is selected and used, may be additionally transmitted. That is, in order to obtain one reference block, the reference frame information, the motion vector prediction index, and the motion vector difference value may have to be transmitted, and in the case of bi-directional prediction, because two reference blocks are used, two pieces of reference frame information, two motion vector prediction indices, and two motion vector difference values may be required. Accordingly, motion estimation may be performed on each of two reference blocks to obtain the reference blocks, and thus, the motion estimation may have to be performed twice. Therefore, in terms of complexity, the above scheme may not be appropriate for real time transmission, such as a system requiring low-delay or low-latency real-time video transmission.

For the real time transmission, a method by which the motion vector difference value of a second reference block may not be transmitted may be considered. According to this method, motion estimation may be performed on only a first reference block by transmitting information about the first reference block, and motion estimation may not be performed on the second reference block. Thus, a predetermined loss may occur in terms of compression efficiency, but it may be preferable for real time transmission in terms of complexity.

In detail, with respect to a block on which bi-directional prediction is performed, the motion vector difference value with respect to the first reference block may be transmitted, and the motion vector difference value with respect to the second reference block may not be transmitted, and a motion vector prediction candidate with respect to the second reference block may be used to determine a motion vector of the second reference block. In this case, when there are a plurality of motion vector prediction candidates which may be selected with respect to the second reference block, a flag or an index may have to be signaled to select one of the plurality of motion vector prediction candidates, and thus, a determination process for selecting one of the plurality of motion vector prediction candidates may have to be additionally performed by an encoding end. In general, for this determination process, with respect to each of the motion vector prediction candidates that may be selected, a reference block in a corresponding position may be fetched from a reference picture referred to by each motion vector prediction candidate, and an average of the reference block with the first reference block obtained through a motion vector of the first reference block may be calculated to generate a prediction block of a current block. Then, a cost may be calculated by using a cost function, such as a sum of absolute difference (SAD), and a motion vector prediction candidate having a relatively less cost may be selected. In this case, data may have to be fetched from reference pictures provided in an external memory as required to match the number of motion vector prediction candidates, and thus, a bandwidth of a required external memory may be increased. Therefore, it is not preferable for real-time transmission.

As a method of solving this aspect, it may be configured that a motion vector prediction candidate indicated by a value of a predetermined index position may be unconditionally transmitted from among the motion vector prediction candidates with respect to the second reference block that may be selected. In detail, it may be configured to always transmit a motion vector prediction candidate indicated by a first index. Accordingly, the encoding end may always configure and transmit a flag of the motion vector prediction candidate of the second reference block as 0. In this case, there may be no need to fetch a plurality of reference blocks to determine the motion vector prediction candidate, and thus, there may be improvement in terms of complexity, but the compression efficiency may be reduced.

To solve this, according to an embodiment of the disclosure, one of the motion vector prediction candidates of the second reference block may be selected as the second reference block by taking into account a relationship between the motion vector of the first reference block and the motion vector prediction candidates of the second reference block. In this case, there may be no need to fetch the plurality of reference blocks from the external memory, and thus, there may be improvement in terms of complexity, and the compression efficiency may be increased compared to a method of simply using a predetermined index. That is, loss in terms of image quality may be minimized, and there may be improvement in terms of complexity.

Figure 4A:
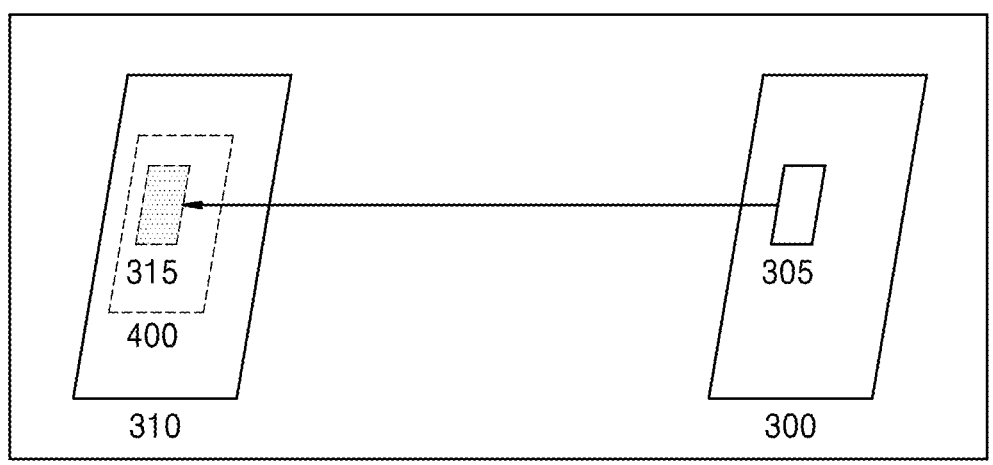
FIG. 4A is a diagram for describing a method of obtaining a first reference block of a current block through motion estimation, according to an embodiment of the disclosure.

FIG. 4A is a diagram for describing a method of obtaining a first reference block of a current block through motion estimation, according to an embodiment of the disclosure.

Referring to FIG. 4A, to search for the first reference block 315 in the first reference frame 310 of the current block 305 of the current frame 300, a motion search may be performed in a motion search area 400 by using information about the first reference block, and motion compensation may be performed to obtain the first reference block 315.

Figure 4B:
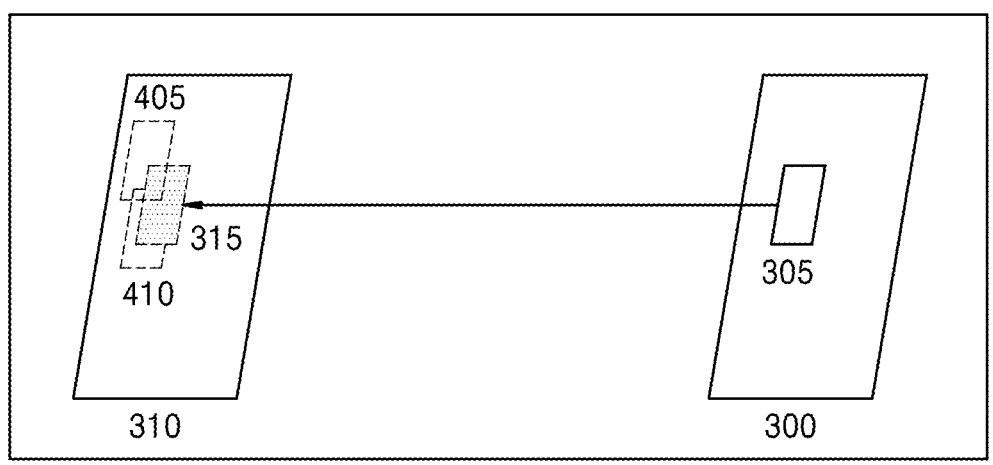
FIG. 4B is a diagram for describing a method of deriving a second reference block by using a first reference block obtained through motion estimation and candidate blocks of a current block, according to an embodiment of the disclosure.

FIG. 4B is a diagram for describing a method of deriving a second reference block by using the first reference block obtained through motion estimation and candidate blocks of the current block, according to an embodiment of the disclosure.

Referring to FIG. 4B, the first reference block 315 may be obtained first according to motion compensation as illustrated in FIG. 4A. When the first reference block 315 and the second reference block are included in the same frame, which is the first reference frame 310, candidate positions of a first candidate block 405 and of a second candidate block 410 of the second reference block in the first reference frame 310 may be obtained from neighboring blocks of the current block 305 of the current frame 300. A distance between the first reference block 315 and each of the first candidate block 405 and the second candidate block 410 of the second reference block may be identified, and the first candidate block 405, which has a greatest distance from the first reference block 315, may be determined as the second reference block.

The distance between the first reference block 315 and each of the first candidate block 405 and the second candidate block 410 of the second reference block may be identified by the Euclidean distance measurement method, the Manhattan distance measurement method, or the like.

In detail, when a motion vector of the first reference block is (x0, y0), a motion vector of the second reference block is (x1, y1), the number of motion vector prediction candidates of the second reference block MV1 is 2, a first candidate MVP_1_1 of the second reference block MV1 is (x11, y11), and a second candidate MVP_1_2 of the second reference block MV1 is (x12, y12), the second reference block may be determined according to a pseudo code as Equation 1 below by comparing values obtained by measuring the Manhattan distances between the candidates and the first reference block.

$Cost1=|x0-x11|+|y0-y11|$ $Cost2=|x0-x12|+|y0-y12|$ if(Cost1>Cost2)

MV1=MVP_1_1 else//(Cost1<=Cost2)

MV1=MVP_1_2   [Equation 1]

When the second reference block is selected in the same frame, and when a block near to the first reference block is selected, an image having a similar shape as the case of using only the first reference block may be generated. However, when a block far from the first reference block is selected, a reference image having a new shape may be generated. Thus, coding efficiency may be improved by variously using the reference image.

That is, a decoding end may receive motion information (a motion vector difference value and a motion vector prediction candidate index) with respect to the first reference block, may determine a motion vector of the first reference block by using the received motion information, may determine a candidate list including candidate blocks with respect to the second reference block by using a neighboring block of the current block, and may determine and use a block from among the candidate blocks with respect to the second reference block, the block having a greatest distance from a position of the first reference block, as the second reference block. Accordingly, only the motion information about the first reference block may be transmitted, and a motion vector with respect to the second reference block may be determined by using the motion information about the first reference block transmitted, without transmitting motion information about the second reference block. Thus, a size of transmission information may be reduced, and the reference block may be efficiently selected to improve the compression efficiency.

In detail, the decoding end obtains information with respect to the motion vector of the first reference block. The information with respect to the motion vector of the first reference block includes an index indicating one of motion vector prediction candidates with respect to the first reference block and a motion vector difference value. The decoding end obtains the motion vector of the first reference block by using the information with respect to the motion vector of the first reference block and determines the candidate list including the motion vector prediction candidates of the second reference block. The decoding end identifies a distance between the motion vector of the first reference block and a motion vector of each of the motion vector prediction candidates of the second reference block. When the motion vector of the first reference block is (x0, y0), and the motion vector of the motion vector prediction candidate is (x1, y1), the distance may be measured as |x0−x1|+|y0−y1|. Based on the measured distance, the motion vector of the motion vector prediction candidate having a greatest distance from the motion vector of the first reference block is determined as the motion vector of the second reference block.

According to an embodiment of the disclosure, the motion vector prediction candidate of the candidate block having a least distance from among distances between the motion vector of the first reference block and the motion vectors of the motion vector prediction candidates of the second reference block may be determined as the motion vector of the second reference block.

Also, a distance between the current block 305, rather than the first reference block 315, and each of the first candidate block 405 and the second candidate block 410 of the second reference block may be identified, and a motion vector prediction candidate of a candidate block having a greatest distance or a motion vector prediction candidate of a candidate block having a least distance may be determined as the motion vector of the second reference block.

Also, based on a distance between the first reference block 315 and the current block 305, the motion vector prediction candidate of the candidate block having the greatest distance from the first reference block 315 or the motion vector prediction candidate of the candidate block having the least distance from the first reference block 315 may be determined as the motion vector of the second reference block. In detail, when the distance between the first reference block 315 and the current block 305 is equal to or less than predetermined K, the motion vector prediction candidate of the candidate bock having the greatest distance from the first reference block 315 may be determined as the motion vector of the second reference block, and when the distance between the first reference block 315 and the current block 305 is greater than K, the motion vector prediction candidate of the candidate block having the least distance from the first reference block 315 may be determined as the motion vector of the second reference block. Also, when the distance between the first reference block 315 and the current block 305 is less than predetermined K, the motion vector prediction candidate of the candidate bock having the greatest distance from the first reference block 315 may be determined as the motion vector of the second reference block, and when the distance between the first reference block 315 and the current block 305 is equal to or greater than K, the motion vector prediction candidate of the candidate block having the least distance from the first reference block 315 may be determined as the motion vector of the second reference block. In this case also, a plurality of reference blocks are not needed to be fetched from an external memory, and thus, the aspect of complexity may be improved, and the compression efficiency may be increased compared to a case of simply using a predetermined index.

According to an embodiment of the disclosure, the number of motion vector candidates of the second reference block may be two or higher.

According to an embodiment of the disclosure, when the number of motion vector candidates for the motion vector of the first reference block is 2, the number of motion vector candidates for the motion vector of the second reference block may be two or higher.

According to an embodiment of the disclosure, when a motion vector difference value with respect to the second reference block is transmitted in a predetermined picture or a predetermined block, it may be configured to signal an index or a flag with respect to the motion vector candidates of the second reference block, or it may be configured to determine the motion vector of the second reference block based on the distance between the motion vector of the first reference block and the motion vector of each of the motion vector prediction candidates of the second reference block without signaling the index or the flag.

Figure 5A:
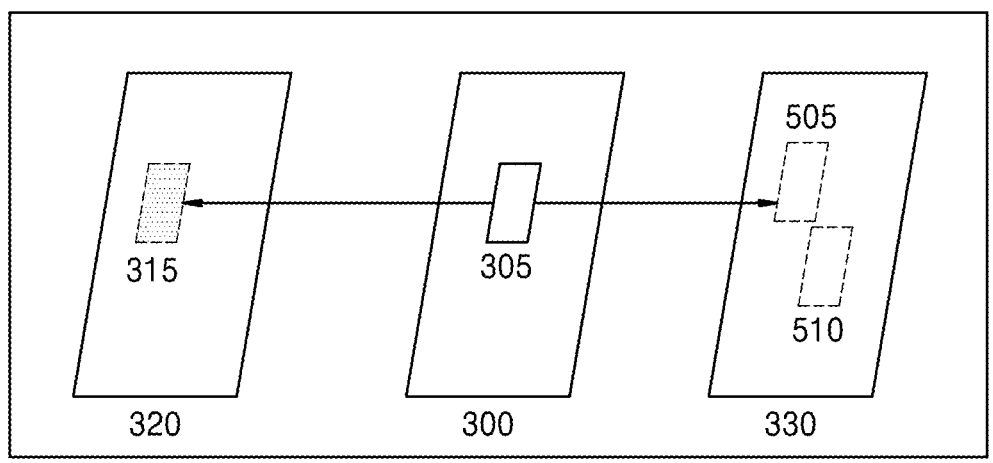
FIG. 5A is a diagram for describing a method of deriving a second reference block by using a first reference block obtained through motion estimation and candidate blocks of a current block, according to an embodiment of the disclosure.

FIG. 5A is a diagram for describing a method of deriving a second reference block by using a first reference block obtained by motion estimation and candidate blocks of a current block, according to an embodiment of the disclosure.

Referring to FIG. 5A, the first reference block 315 may be obtained first according to motion compensation. When the first reference block 315 is included in the first reference frame 320, and the second reference block is included in the second reference frame 330 corresponding to a different time point from the first reference frame 320, candidate positions of a first candidate block 505 and of a second candidate block 510 of the second reference block in the second reference frame 330 may be obtained from neighboring blocks of the current block 305 in the current frame 300. A distance between the first reference block 315 and each of the first candidate block 505 and the second candidate block 510 of the second reference block may be identified, and a candidate block of the first and second candidate blocks 505 and 510, the candidate block having a least distance, may be determined as the second reference block.

In the case of bi-directional prediction, when two reference blocks are included in different reference frames from each other, it is highly probable that the reference blocks indicate same object. Thus, when a candidate block having a less distance may be determined as the second reference block, based on the distance between the first reference block obtained by using information with respect to a motion vector and each of the candidate blocks of the second reference block, the coding efficiency may be improved.

In detail, a decoding end may obtain the information with respect to the motion vector of the first reference block. The information with respect to the motion vector of the first reference block may include a direction of the first reference frame including the first reference block, that is, a directional index indicating whether the first reference frame corresponds to a previous time point or a future time point based on the current frame, a reference index indicating the first reference frame, an index indicating one of motion vector prediction candidates with respect to the first reference block, and a motion vector difference value. The decoding end may obtain the motion vector of the first reference block by using the information with respect to the motion vector of the first reference block. The decoding end may determine, by using the directional index, a candidate list including motion vector prediction candidates of the second reference block, having a different direction from the motion vector of the first reference block from among motion vector prediction candidates of the second reference block. The decoding end may obtain a picture order count (POC) of the reference frame by using the reference index. The POC may denote a value numbered according to a display order of a picture. The decoding end may identify, by using the POC, a scaled distance between the motion vector of the first reference block and a motion vector of each of the motion vector prediction candidates having the different direction from the motion vector of the first reference block from among the motion vector prediction candidates of the second reference block. When the motion vector of the first reference block and the POC are (x0, y0, POC0), and the motion vector of the motion vector prediction candidate and the POC are (x1, y1, POC1), the scaled distance may be measured according to Equation 2.

$$\text{dist}=(|x0-x1|+|y0-y1|)/|POC-POC1|*|POC-POC0| \quad \text{[Equation 2]}$$

The motion vector of the motion vector prediction candidate having a least distance from the motion vector of the first reference block based on the measured distance dist, that is, the scaled distance, may be determined as the motion vector of the second reference block.

According to an embodiment of the disclosure, the motion vector of the motion vector prediction candidate having a greatest distance from the motion vector of the first reference block based on the scaled distance may be determined as the motion vector of the second reference block. According to an embodiment of the disclosure, when there is one motion vector having a far POC based on POC0, the corresponding motion vector may be directly used.

According to an embodiment of the disclosure, when there are a plurality of motion vectors having a far POC based on POC0, a motion vector having a greatest distance from the motion vector of the first reference block, from among the plurality of motion vector candidates having the far POC based on POC0, may be used.

According to an embodiment of the disclosure, when there is one motion vector having a near POC based on POC0, the corresponding motion vector may be directly used.

According to an embodiment of the disclosure, when there are a plurality of motion vectors having a near POC based on POC0, a motion vector having a least distance from the motion vector of the first reference block, from among the plurality of motion vector candidates having the near POC based on POC0, may be used.

Figure 5B:
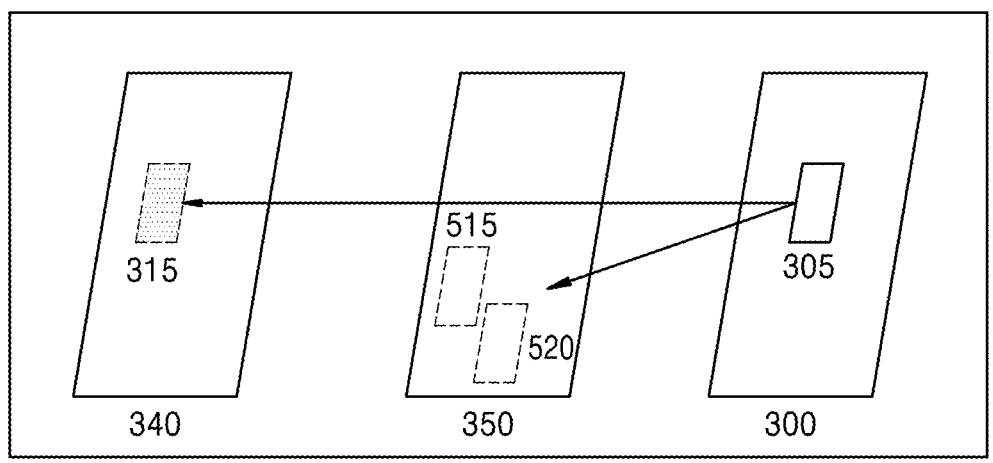
FIG. 5B is a diagram for describing a method of deriving a second reference block by using a first reference block obtained through motion estimation and candidate blocks of a current block, according to an embodiment of the disclosure.

FIG. 5B is a diagram for describing a method of deriving a second reference block by using a first reference block obtained by motion estimation and candidate blocks of a current block, according to an embodiment of the disclosure.

Referring to FIG. 5B, the first reference block 315 may be obtained first according to motion compensation. When the first reference block 315 is included in the first reference frame 340, and the second reference block is included in the second reference frame 350 corresponding to the same time point as the first reference frame 340, candidate positions 515 and 520 of the second reference block in the second reference frame 350 may be obtained from neighboring blocks of the current block 305 in the current frame 300. A distance between the first reference block 315 and each of the first candidate block 515 and the second candidate block 520 of the second reference block may be identified, and a candidate block of the first and second candidate blocks 515 and 520, the candidate block having a least distance, may be determined as the second reference block.

In detail, a decoding end may obtain information with respect to a motion vector of the first reference block. The information with respect to the motion vector of the first reference block includes a reference index indicating the first reference frame including the first reference block, an index indicating one of motion vector prediction candidates with respect to the first reference block, and a motion vector difference value. The decoding end obtains the motion vector of the first reference block by using the information with respect to the motion vector of the first reference block and determines a candidate list including motion vector prediction candidates of the second reference block. The decoding end obtains a POC of the reference frame by using the reference index. The decoding end identifies, by using the POC, a scaled distance between the motion vector of the first reference block and a motion vector of each of the motion vector prediction candidates of the second reference block. When the motion vector of the first reference block and the POC are (x0, y0, POC0), and the motion vector of the motion vector prediction candidate and the POC are (x1, y1, POC1), the scaled distance may be measured according to Equation 3.

$$\text{dist}=(|x0-x1|+|y0-y1|)/|POC-POC1|*[POC-POC0] \quad \text{[Equation 3]}$$

The motion vector of the motion vector prediction candidate having a least distance from the motion vector of the first reference block based on the measured distance dist, that is, the scaled distance, may be determined as the motion vector of the second reference block.

According to an embodiment of the disclosure, the motion vector of the motion vector prediction candidate having a greatest distance from the motion vector of the first reference block based on the scaled distance may be determined as the motion vector of the second reference block.

According to an embodiment of the disclosure, when there is one motion vector having a far POC based on POC0, the corresponding motion vector may be directly used.

According to an embodiment of the disclosure, when there are a plurality of motion vectors having a far POC based on POC0, a motion vector having a greatest distance from the motion vector of the first reference block, from among the plurality of motion vector candidates having the far POC based on POC0, may be used.

According to an embodiment of the disclosure, when there is one motion vector having a near POC based on POC0, the corresponding motion vector may be directly used.

According to an embodiment of the disclosure, when there are a plurality of motion vectors having a near POC based on POC0, a motion vector having a least distance from the motion vector of the first reference block, from among the plurality of motion vector candidates having the near POC based on POC0, may be used.

According to an embodiment of the disclosure, when there are a plurality of reference pictures or reference frames, distances between the first reference block and the motion vector candidates of the second reference block may be identified by scaling the motion vector candidates of the second reference block based on a distance between a current picture and a first reference picture including the first reference block based on the motion vector of the first reference block and a distance between the current picture and a second reference picture including the motion vector candidates of the second reference block. By doing so, a candidate block of the second reference block may be obtained.

In detail, the distance may be identified according to a cost function f(N) of Equation 4 below.

$$f(N) = \left| \frac{(POC_C - POC_{L0})}{(POC_C - POC_{L1}[N])} * MvL1[N][0] - MvL0[0] \right| + \left| \frac{(POC_C - POC_{L0})}{(POC_C - POC_{L1}[N])} * MvL1[N][1] - MvL0[1] \right|$$
[Equation 4]

$POC_c$ is a POC of the current picture including the current block, and when the motion vector of the first reference block is MvL0, MvL0 [0] is an x component of the motion vector of the first reference block, and MvL0 [1] is a y component of the motion vector of the first reference block. $POC_{1,0}$ is a POC of the first reference picture including the first reference block, and when the motion vector candidate of the second reference block is MvL1 [N], MvL1 [N] [0] is an x component of the motion vector candidate of the second reference block, and MvL1 [N] [1] is a y component of the motion vector candidate of the second reference block. $POC_{1,1}$ is a POC of the second reference picture including the motion vector candidate of the second reference block, and N is an index indicating a predetermined motion vector prediction candidate and may be greater than or equal to 1 and less than or equal to M.

According to Equation 5 below, a final candidate NF having a greatest cost may be determined by using the cost function f(N) of Equation 4 above, and the final candidate NF may be determined as the motion vector of the second reference block.

$$N_F = \underset{N}{arg\,max}\, f(N)$$

$MvL1[0] = MvL1[N_F][0]$ $MvL1[1] = MvL1[N_F][1]$  [Equation 5]

According to an embodiment of the disclosure, unlike Equation 5, a final candidate having a least cost may be determined by using the cost function f(N) of Equation 4 above, and the final candidate may be determined as the motion vector of the second reference block.

According to an embodiment of the disclosure, when there is one reference picture, a term for comparing the POC may be removed to generate Equation 6 below.

$f(N) = |MvL1[N][0] - MUL0[0]| + |MvL1[N][1] - MvL0[1]|$   [Equation 6]

According to an embodiment of the disclosure, the candidate may be selected according to an order of a candidate of the second reference picture indicated by the motion vector candidate of the second reference block, the second reference picture having a greatest distance from the first reference picture indicated by the motion vector of the first reference block. Also, when there is one motion vector candidate included in the second reference picture having the greatest distance, the corresponding candidate may be selected as the motion vector of the second reference block.

According to an embodiment of the disclosure, the candidate may be selected according to an order of a candidate of the second reference picture indicated by the motion vector candidate of the second reference block, the second reference picture having a least distance from the first reference picture indicated by the motion vector of the first reference block. Also, when there is one motion vector candidate included in the second reference picture having the least distance, the corresponding candidate may be selected as the motion vector of the second reference block.

According to an embodiment of the disclosure, when there are a plurality of motion vector candidates included in the second reference picture indicated by the motion vector candidate of the second reference block, the second reference picture having the greatest distance from the first reference picture indicated by the motion vector of the first reference block, the distance may be identified according to Equation 7.

$$f(N) = \left| \frac{(POC_C - POC_{L0})}{(POC_C - POC_{L1}[N])} * MvL1[N][0] - MvL0[0] \right| + \left| \frac{(POC_C - POC_{L0})}{(POC_C - POC_{L1}[N])} * MvL1[N][1] - MvL0[1] \right|$$
[Equation 7]

$POC_c$ is a POC of the current picture including the current block, and when the motion vector of the first reference block is MvL0, MvL0 [0] is an x component of the motion vector of the first reference block, and MvL0 [1] is a y component of the motion vector of the first reference block. $POC_{1,0}$ is a POC of the first reference picture including the first reference block, and when the motion vector candidate of the second reference block is MvL1 [N], MvL1 [N] [0] is an x component of the motion vector candidate included in the second reference picture having the greatest distance from the first reference picture, from among reference pictures including the second reference block, and MvL1 [N] [1] is a y component of the motion vector candidate included in the second reference picture having the greatest distance from the first reference picture, from among the reference pictures including the second reference block. $POC_{1,1}$ is a POC of the second reference picture having the greatest distance from the first reference picture, from among the reference pictures including the second reference block, and N is an index indicating a predetermined motion vector prediction candidate and may be greater than or equal to 2 and less than or equal to M.

According to Equation 8 below, a final candidate Nr having a greatest cost may be determined by using the cost function f(N) of Equation 7 above, and the final candidate Nr may be determined as the motion vector of the second reference block.

$$N_F = \underset{N}{\arg\max} \, f(N)$$

$$MvL1[0] = MvL1[N_F][0]$$

$$MvL1[1] = MvL1[N_F][1] \quad \text{[Equation 8]}$$

According to an embodiment of the disclosure, in Equation 7 above, MvL1 [N] [0] may be an x component of the motion vector candidate included in the second reference picture having the least distance from the first reference picture from among the reference pictures including the second reference block, and MvL1 [N] [1] may be a y component of the motion vector candidate included in the second reference picture having the least distance from the first reference picture from among the reference pictures including the second reference block. $POC_{1,1}$ may be a POC of the second reference picture having the least distance from the first reference picture from among the reference pictures including the second reference block. Accordingly, unlike Equation 8, a final candidate having a least cost may be determined by using the cost function f(N) of Equation 7 above, and the final candidate may be determined as the motion vector of the second reference block.

According to an embodiment of the disclosure, the distance may be identified by scaling the motion vector of the first reference block as represented in Equation 9 below. In this case, scaling may have to be performed only once on the motion vector of the first reference block.

$$f(N) = \left| MvL1[N][0] - \frac{(POC_C - POC_{L1}(N))}{(POC_C - POC_{L0})} * MvL0[0] \right| + \left| MvL1[N][1] - \frac{(POC_C - POC_{L1}[N])}{(POC_C - POC_{L0})} * MvL0[1] \right| \quad \text{[Equation 9]}$$

According to an embodiment of the disclosure, instead of the Manhattan distance measurement method of Equation 1 above, the Euclidean distance measurement method may be used as in Equation 10 below.

$$f(N) = \sqrt{(MvL1[N][0] - MvL0[0])^2 + (MvL1[N][1] - MvL0[1])^2} \quad \text{[Equation 10]}$$

Here, when the motion vector of the first reference block is MvL0, MvL0 [0] is an x component of the motion vector of the first reference block, MvL0 [1] is a y component of the motion vector of the first reference block, and when the motion vector candidate of the second reference block is MvL1 [N], MvL1 [N] [0] is an x component of the motion vector candidate of the second reference block, and MvL1 [N] [1] is a y component of the motion vector candidate of the second reference block.

Figure 6:
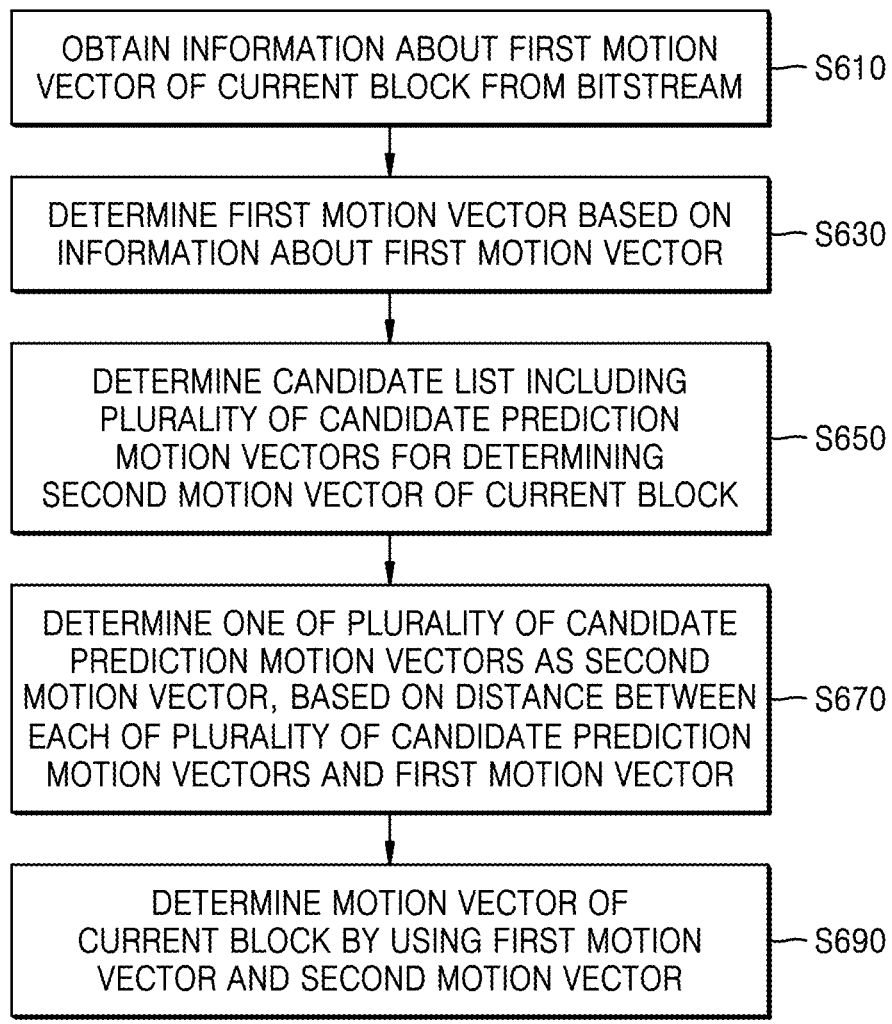
FIG. 6 is a flowchart of a video decoding method according to an embodiment of the disclosure.

FIG. 6 is a flowchart of a video decoding method according to an embodiment of the disclosure.

In operation S610, a video decoding apparatus 700 may obtain information about a first motion vector of a current block from a bitstream.

According to an embodiment of the disclosure, the information about the first motion vector of the current block may be determined by an encoding end through the sum of transform difference (SATD) or rate distortion optimization (RDO) calculation and may be transmitted by the encoding end through the bitstream.

According to an embodiment of the disclosure, a relationship between a first reference frame including a first reference block and a second reference frame including motion vector candidates of a second reference block may be determined according to information included in information with respect to a motion vector of the first reference block.

According to an embodiment of the disclosure, when the information with respect to the motion vector of the first reference block includes an index indicating one of motion vector prediction candidates with respect to the first reference block and a motion vector difference value, the first reference frame including the first reference block and the second reference frame including the motion vector candidates of the second reference block may be the same as each other.

According to an embodiment of the disclosure, when the information with respect to the motion vector of the first reference block includes a reference index indicating the first reference frame, the index indicating one of the motion vector prediction candidates with respect to the first reference block, and the motion vector difference value, the first reference frame including the first reference block and the second reference frame including the motion vector candidates of the second reference block may be different from each other, and time points of the first reference frame and the second reference frame may be the same as each other, based on a current frame including the current block.

According to an embodiment of the disclosure, when the information with respect to the motion vector of the first reference block includes a direction of the first reference frame including the first reference block, that is, a directional index indicating whether the first reference frame corresponds to a previous time point or a future time point based on the current frame, the reference index indicating the first reference frame, the index indicating one of the motion vector prediction candidates with respect to the first reference block, and the motion vector difference value, the first reference frame including the first reference block and the second reference frame including the motion vector candidates of the second reference block may be different from each other, and the time points of the first reference frame and the second reference frame may be different from each other based on the current frame.

In operation S630, the video decoding apparatus 700 may determine the first motion vector based on the information about the first motion vector.

In operation S650, the video decoding apparatus 700 may determine a candidate list including a plurality of candidate prediction motion vectors for determining a second motion vector of the current block.

In operation S670, based on a distance between each of the plurality of candidate prediction motion vectors and the first motion vector, the video decoding apparatus 700 may determine one of the plurality of candidate prediction motion vectors as the second motion vector.

According to an embodiment of the disclosure, when the first reference frame of the first motion vector is the same as the second reference frame of the plurality of candidate prediction motion vectors, the second motion vector may be a candidate prediction motion vector from among the plurality of candidate prediction motion vectors, the candidate prediction motion vector having a greatest distance from the first motion vector.

According to an embodiment of the disclosure, when the first reference frame of the first motion vector is the same as the second reference frame of the plurality of candidate prediction motion vectors, the distance may be identified by using an x component and a y component of each of the plurality of candidate prediction motion vectors and an x component and a y component of the first motion vector.

According to an embodiment of the disclosure, when the first reference frame of the first motion vector is different from the second reference frame of the plurality of candidate prediction motion vectors, the second motion vector may be a candidate prediction motion vector from among the plurality of candidate prediction motion vectors, the candidate prediction motion vector having a least distance from the first motion vector.

According to an embodiment of the disclosure, when the first reference frame of the first motion vector and the second reference frame of the plurality of candidate prediction motion vectors are different from each other, and a direction of the first reference frame and a direction of the second reference frame are the same as each other, the distance may be identified by scaling the plurality of candidate prediction motion vectors based on a POC of the first reference frame, a POC of each of the plurality of candidate prediction motion vectors, and a POC of the current block.

According to an embodiment of the disclosure, when the first reference frame of the first motion vector and the second reference frame of the plurality of candidate prediction motion vectors are different from each other, and the direction of the first reference frame and the direction of the second reference frame are different from each other, second candidate prediction motion vectors having a different direction from the first motion vector, from among the plurality of candidate prediction motion vectors, may be determined, and the distance may be identified by scaling the second candidate prediction motion vectors based on the POC of the first reference frame, a POC of each of the second candidate prediction motion vectors, and the POC of the current block.

According to an embodiment of the disclosure, when the plurality of candidate prediction motion vectors corresponds to a plurality of second reference frames, the distance may be identified by scaling the second candidate prediction motion vectors based on the POC of the first reference frame, the POC of each of the second candidate prediction motion vectors, and the POC of the current block.

According to an embodiment of the disclosure, when the plurality of candidate prediction motion vectors correspond to the plurality of second reference frames, a third reference frame having a least distance from the first reference frame of the first motion vector may be determined from among the plurality of second reference frames, and the second motion vector may be determined based on a distance between each of a plurality of third candidate prediction motion vectors included in the third reference frame and the first motion vector.

According to an embodiment of the disclosure, when the plurality of candidate prediction motion vectors correspond to the plurality of second reference frames, the third reference frame having the least distance from the first reference frame of the first motion vector may be determined from among the plurality of second reference frames, and when the third reference frame includes one third candidate prediction motion vector, the third candidate prediction motion vector may be determined as the second motion vector.

In operation S690, the video decoding apparatus 700 may determine a motion vector of the current block by using the first motion vector and the second motion vector.

Figure 7:
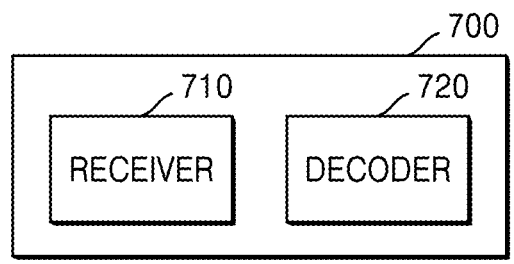
FIG. 7 is a diagram illustrating components of a video decoding apparatus according to an embodiment of the disclosure.

FIG. 7 is a diagram illustrating components of a video decoding apparatus according to an embodiment of the disclosure.

Referring to FIG. 7, the video decoding apparatus 700 may include a receiver 710 and a decoder 720.

The receiver 710 and the decoder 720 may be implemented as one or more processors. The receiver 710 and the decoder 720 may operate according to an instruction stored in a memory.

FIG. 7 separately illustrates the receiver 710 and the decoder 720. However, the receiver 710 and the decoder 720 may be implemented as one processor. In this case, the receiver 710 and the decoder 720 may be implemented as a dedicated processor, or as a combination of software and a general-purpose processor, such as an application processor (AP), a central processing unit (CPU), or a graphic processing unit (GPU). Also, in the case of a dedicated processor, the receiver 710 and the decoder 720 may include a memory for realizing an embodiment of the disclosure or may include a memory processor to use an external memory.

The receiver 710 and the decoder 720 may include a plurality of processors. In this case, the receiver 710 and the decoder 720 may be implemented as a combination of dedicated processors or as a combination of software and a plurality of general-purpose processors including an AP, a CPU, a GPU, and the like. Also, the processor may include an artificial intelligence (AI)-dedicated processor. As another example, the AI-dedicated processor may be implemented as a separate chip from the processor.

The receiver 710 may obtain the information about a first motion vector of a current block from a bitstream.

According to an embodiment of the disclosure, the information about the first motion vector of the current block may be determined by the SATD or RDO calculation and may be transmitted by the encoding end through the bitstream.

The decoder 720 may determine the first motion vector based on the information about the first motion vector.

The decoder 720 may determine a candidate list including a plurality of candidate prediction motion vectors for determining a second motion vector of the current block.

The decoder 720 may determine one of the plurality of candidate prediction motion vectors as the second motion vector, based on a distance between each of the plurality of candidate prediction motion vectors and the first motion vector.

The decoder 720 may determine a motion vector of the current block by using the first motion vector and the second motion vector.

Figure 8:
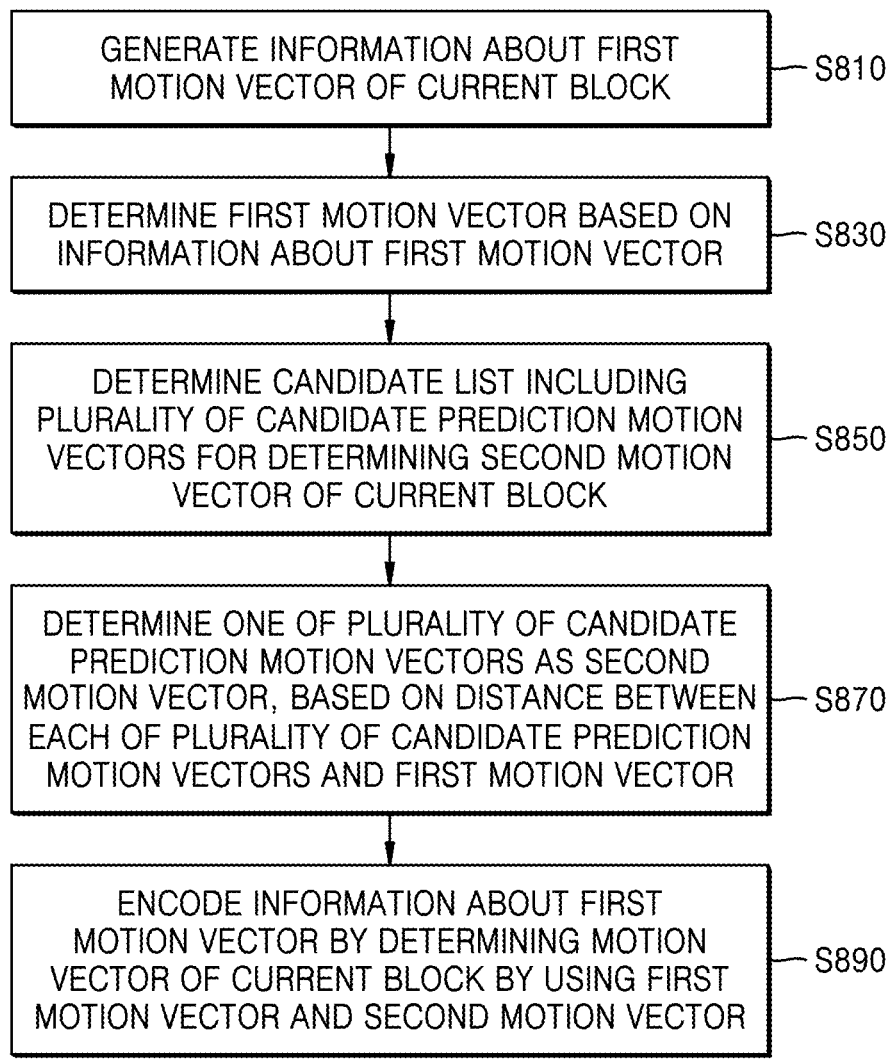
FIG. 8 is a flowchart of a video encoding method according to an embodiment of the disclosure.

FIG. 8 is a flowchart of a video encoding method according to an embodiment of the disclosure.

In operation S810, a video encoding apparatus 900 may generate information about a first motion vector of a current block.

According to an embodiment of the disclosure, information included in information with respect to a motion vector of a first reference block may be determined according to a relationship between a first reference frame including the first reference block and a second reference frame including motion vector candidates of a second reference block.

According to an embodiment of the disclosure, when the first reference frame including the first reference block and the second reference frame including the motion vector candidates of the second reference block are the same as each other, the information with respect to the motion vector of the first reference block may include an index indicating one of motion vector prediction candidates with respect to the first reference block and a motion vector difference value.

According to an embodiment of the disclosure, when the first reference frame including the first reference block and the second reference frame including the motion vector candidates of the second reference block are different from each other, and time points of the first reference frame and the second reference frame are the same as each other based on a current frame including the current block, the information with respect to the motion vector of the first reference block may include a reference index indicating the first reference frame, the index indicating one of the motion vector prediction candidates with respect to the first reference block, and the motion vector difference value.

According to an embodiment of the disclosure, when the first reference frame including the first reference block and the second reference frame including the motion vector candidates of the second reference block are different from each other, and the time points of the first reference frame and the second reference frame are different from each other based on the current frame including the current block, the information with respect to the motion vector of the first reference block may include a direction of the first reference frame including the first reference block, that is, a directional index indicating whether the first reference frame corresponds to a previous time point or a future time point based on the current frame, the reference index indicating the first reference frame, the index indicating one of the motion vector prediction candidates with respect to the first reference block, and the motion vector difference value.

In operation S830, the video encoding apparatus 900 may determine the first motion vector based on the information about the first motion vector.

In operation S850, the video encoding apparatus 900 may determine a candidate list including a plurality of candidate prediction motion vectors for determining a second motion vector of the current block.

In operation S870, the video encoding apparatus 900 may determine one of the plurality of candidate prediction motion vectors as the second motion vector, based on a distance between each of the plurality of candidate prediction motion vectors and the first motion vector.

According to an embodiment of the disclosure, when the first reference frame of the first motion vector is the same as the second reference frame of the plurality of candidate prediction motion vectors, the second motion vector may be a candidate prediction motion vector from among the plurality of candidate prediction motion vectors, the candidate prediction motion vector having a greatest distance from the first motion vector.

According to an embodiment of the disclosure, when the first reference frame of the first motion vector is the same as the second reference frame of the plurality of candidate prediction motion vectors, the distance may be identified by using an x component and a y component of each of the plurality of candidate prediction motion vectors and an x component and a y component of the first motion vector.

According to an embodiment of the disclosure, when the first reference frame of the first motion vector is different from the second reference frame of the plurality of candidate prediction motion vectors, the second motion vector may be a candidate prediction motion vector from among the plurality of candidate prediction motion vectors, the candidate prediction motion vector having a least distance from the first motion vector.

According to an embodiment of the disclosure, when the first reference frame of the first motion vector and the second reference frame of the plurality of candidate prediction motion vectors are different from each other, and a direction of the first reference frame and a direction of the second reference frame are the same as each other, the distance may be identified by scaling the plurality of candidate prediction motion vectors based on a POC of the first reference frame, a POC of each of the plurality of candidate prediction motion vectors, and a POC of the current block.

According to an embodiment of the disclosure, when the first reference frame of the first motion vector and the second reference frame of the plurality of candidate prediction motion vectors are different from each other, and the direction of the first reference frame and the direction of the second reference frame are different from each other, second candidate prediction motion vectors having a different direction from the first motion vector, from among the plurality of candidate prediction motion vectors, may be determined, and the distance may be identified by scaling the second candidate prediction motion vectors based on the POC of the first reference frame, a POC of each of the second candidate prediction motion vectors, and the POC of the current block.

According to an embodiment of the disclosure, when the plurality of candidate prediction motion vectors corresponds to a plurality of second reference frames, the distance may be identified by scaling the second candidate prediction motion vectors based on the POC of the first reference frame, the POC of each of the second candidate prediction motion vectors, and the POC of the current block.

According to an embodiment of the disclosure, when the plurality of candidate prediction motion vectors correspond to the plurality of second reference frames, a third reference frame having a least distance from the first reference frame of the first motion vector may be determined from among the plurality of second reference frames, and the second motion vector may be determined based on a distance between each of a plurality of third candidate prediction motion vectors included in the third reference frame and the first motion vector.

According to an embodiment of the disclosure, when the plurality of candidate prediction motion vectors correspond to the plurality of second reference frames, the third reference frame having the least distance from the first reference frame of the first motion vector may be determined from among the plurality of second reference frames, and when the third reference frame includes one third candidate prediction motion vector, the third candidate prediction motion vector may be determined as the second motion vector.

In operation S890, the video encoding apparatus 900 may encode the information about the first motion vector by determining a motion vector of the current block by using the first motion vector and the second motion vector.

According to an embodiment of the disclosure, the information about the first motion vector of the current block may be determined and signaled by an encoding end through the SATD or RDO calculation.

Figure 9:
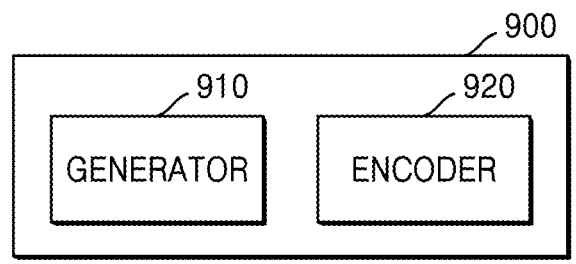
FIG. 9 is a diagram illustrating components of a video encoding apparatus according to an embodiment of the disclosure.

FIG. 9 is a diagram illustrating components of a video encoding apparatus according to an embodiment of the disclosure.

Referring to FIG. 9, the video encoding apparatus 900 may include a generator 910 and an encoder 920.

The generator 910 and the encoder 920 may be implemented as one or more processors. The generator 910 and the encoder 920 may operate according to an instruction stored in a memory.

FIG. 9 separately illustrates the generator 910 and the encoder 920. However, the generator 910 and the encoder 920 may be implemented as one processor. In this case, the generator 910 and the encoder 920 may be implemented as a dedicated processor, or as a combination of software and a general-purpose processor, such as an AP, a CPU, or a GPU. Also, in the case of a dedicated processor, the generator 910 and the encoder 920 may include a memory for realizing an embodiment of the disclosure or may include a memory processor to use an external memory.

The generator 910 and the encoder 920 may include a plurality of processors. In this case, the generator 910 and the encoder 920 may be implemented as a combination of dedicated processors or as a combination of software and a plurality of general-purpose processors including an AP, a CPU, a GPU, and the like. Also, the processor may include an AI-dedicated processor. As another example, the AI-dedicated processor may be implemented as a separate chip from the processor.

The generator 910 may generate the information about a first motion vector of a current block from a bitstream.

The encoder 920 may determine the first motion vector based on the information about the first motion vector.

The encoder 920 may determine a candidate list including a plurality of candidate prediction motion vectors for determining a second motion vector of the current block.

The encoder 920 may determine one of the plurality of candidate prediction motion vectors as the second motion vector, based on a distance between each of the plurality of candidate prediction motion vectors and the first motion vector.

The encoder 920 may encode the information about the first motion vector by determining a motion vector of the current block by using the first motion vector and the second motion vector.

According to an embodiment of the disclosure, the information about the first motion vector of the current block may be determined and signaled by an encoding end through the SATD or RDO calculation.

A video decoding method according to an embodiment of the disclosure may include: obtaining information about a first motion vector of a current block from a bitstream; determining the first motion vector based on the information about the first motion vector; determining a candidate list including a plurality of candidate prediction motion vectors for determining a second motion vector of the current block; determining one of the plurality of candidate prediction motion vectors as the second motion vector based on a distance between each of the plurality of candidate prediction motion vectors and the first motion vector; and determining a motion vector of the current block by using the first motion vector and the second motion vector.

According to the video decoding method according to an embodiment of the disclosure, the second motion vector may be determined based on the distances between the first motion vector and the plurality of candidate prediction motion vectors, without signaling information about the second motion vector. Thus, motion compensation may be performed just once, and thus, there may be no need to fetch a plurality of reference blocks from an external memory. Therefore, the complexity aspect may be improved.

According to an embodiment of the disclosure, when a first reference frame of the first motion vector is the same as a second reference frame of the plurality of candidate prediction motion vectors, the second motion vector may be a candidate prediction motion vector from among the plurality of candidate prediction motion vectors, the candidate prediction motion vector having a greatest distance from the first motion vector.

According to an embodiment of the disclosure, when the first reference frame of the first motion vector is the same as the second reference frame of the plurality of candidate prediction motion vectors, the distance may be identified by using an x component and a y component of each of the plurality of candidate prediction motion vectors and an x component and a y component of the first motion vector.

According to an embodiment of the disclosure, when the first reference frame of the first motion vector is different from the second reference frame of the plurality of candidate prediction motion vectors, the second motion vector may be a candidate prediction motion vector from among the plurality of candidate prediction motion vectors, the candidate prediction motion vector having a least distance from the first motion vector.

According to an embodiment of the disclosure, when the first reference frame of the first motion vector and the second reference frame of the plurality of candidate prediction motion vectors are different from each other, and a direction of the first reference frame and a direction of the second reference frame are the same as each other, the distance may be identified by scaling the plurality of candidate prediction motion vectors based on a POC of the first reference frame, a POC of each of the plurality of candidate prediction motion vectors, and a POC of the current block.

According to an embodiment of the disclosure, when the first reference frame of the first motion vector and the second reference frame of the plurality of candidate prediction motion vectors are different from each other, and the direction of the first reference frame and the direction of the second reference frame are different from each other, second candidate prediction motion vectors having a different direction from the first motion vector, from among the plurality of candidate prediction motion vectors, may be determined, and the distance may be identified by scaling the second candidate prediction motion vectors based on the POC of the first reference frame, a POC of each of the second candidate prediction motion vectors, and the POC of the current block.

According to an embodiment of the disclosure, when the plurality of candidate prediction motion vectors correspond to a plurality of second reference frames, the distance may be identified by scaling the second candidate prediction motion vectors based on the POC of the first reference frame, the POC of each of the second candidate prediction motion vectors, and the POC of the current block.

According to an embodiment of the disclosure, when the plurality of candidate prediction motion vectors correspond to the plurality of second reference frames, a third reference frame having a least distance from the first reference frame of the first motion vector may be determined from among the plurality of second reference frames, and the second motion vector may be determined based on a distance between each of a plurality of third candidate prediction motion vectors included in the third reference frame and the first motion vector.

According to an embodiment of the disclosure, when the plurality of candidate prediction motion vectors correspond to the plurality of second reference frames, the third reference frame having the least distance from the first reference frame of the first motion vector may be determined from among the plurality of second reference frames, and when the third reference frame includes one third candidate prediction motion vector, the third candidate prediction motion vector may be determined as the second motion vector.

According to the video decoding method according to an embodiment of the disclosure, the second motion vector may be determined according to a relationship between the first reference frame and the second reference frame without signaling of information about the second motion vector, and thus, the coding efficiency with respect to the current block may be improved.

A video decoding apparatus according to an embodiment of the disclosure may include: a memory storing one or more instructions; and at least one processor configured to operate according to the one or more instructions to: obtain information about a first motion vector of a current block from a bitstream; determine the first motion vector based on the information about the first motion vector; determine a candidate list including a plurality of candidate prediction motion vectors for determining a second motion vector of the current block; determine one of the plurality of candidate prediction motion vectors as the second motion vector based on a distance between each of the plurality of candidate prediction motion vectors and the first motion vector; and determine a motion vector of the current block by using the first motion vector and the second motion vector.

According to the video decoding apparatus according to an embodiment of the disclosure, the second motion vector may be determined based on the distances between the first motion vector and the plurality of candidate prediction motion vectors, without signaling information about the second motion vector. Thus, motion compensation may be performed just once, and thus, there may be no need to fetch a plurality of reference blocks from an external memory. Therefore, the complexity aspect may be improved.

According to an embodiment of the disclosure, when a first reference frame of the first motion vector is the same as a second reference frame of the plurality of candidate prediction motion vectors, the second motion vector may be a candidate prediction motion vector from among the plurality of candidate prediction motion vectors, the candidate prediction motion vector having a greatest distance from the first motion vector.

According to an embodiment of the disclosure, when the first reference frame of the first motion vector is the same as the second reference frame of the plurality of candidate prediction motion vectors, the distance may be identified by using an x component and a y component of each of the plurality of candidate prediction motion vectors and an x component and a y component of the first motion vector.

According to an embodiment of the disclosure, when the first reference frame of the first motion vector is different from the second reference frame of the plurality of candidate prediction motion vectors, the second motion vector may be a candidate prediction motion vector from among the plurality of candidate prediction motion vectors, the candidate prediction motion vector having a least distance from the first motion vector.

According to an embodiment of the disclosure, when the first reference frame of the first motion vector and the second reference frame of the plurality of candidate prediction motion vectors are different from each other, and a direction of the first reference frame and a direction of the second reference frame are the same as each other, the distance may be identified by scaling the plurality of candidate prediction motion vectors based on a POC of the first reference frame, a POC of each of the plurality of candidate prediction motion vectors, and a POC of the current block.

According to an embodiment of the disclosure, when the first reference frame of the first motion vector and the second reference frame of the plurality of candidate prediction motion vectors are different from each other, and the direction of the first reference frame and the direction of the second reference frame are different from each other, second candidate prediction motion vectors having a different direction from the first motion vector, from among the plurality of candidate prediction motion vectors, may be determined, and the distance may be identified by scaling the second candidate prediction motion vectors based on the POC of the first reference frame, a POC of each of the second candidate prediction motion vectors, and the POC of the current block.

According to an embodiment of the disclosure, when the plurality of candidate prediction motion vectors correspond to a plurality of second reference frames, the distance may be identified by scaling the second candidate prediction motion vectors based on the POC of the first reference frame, the POC of each of the second candidate prediction motion vectors, and the POC of the current block.

According to an embodiment of the disclosure, when the plurality of candidate prediction motion vectors correspond to the plurality of second reference frames, a third reference frame having a least distance from the first reference frame of the first motion vector may be determined from among the plurality of second reference frames, and the second motion vector may be determined based on a distance between each of a plurality of third candidate prediction motion vectors included in the third reference frame and the first motion vector.

According to an embodiment of the disclosure, when the plurality of candidate prediction motion vectors correspond to the plurality of second reference frames, the third reference frame having the least distance from the first reference frame of the first motion vector may be determined from among the plurality of second reference frames, and when the third reference frame includes one third candidate prediction motion vector, the third candidate prediction motion vector may be determined as the second motion vector.

According to the video decoding apparatus according to an embodiment of the disclosure, the second motion vector may be determined according to a relationship between the first reference frame and the second reference frame without signaling of information about the second motion vector, and thus, the coding efficiency with respect to the current block may be improved.

A video encoding method according to an embodiment of the disclosure may include: generating information about a first motion vector of a current block; determining the first motion vector based on the information about the first motion vector; determining a candidate list including a plurality of candidate prediction motion vectors for determining a second motion vector of the current block; determining one of the plurality of candidate prediction motion vectors as the second motion vector based on a distance between each of the plurality of candidate prediction motion vectors and the first motion vector; and encoding the information about the first motion vector by determining a motion vector of the current block by using the first motion vector and the second motion vector.

According to the video encoding method according to an embodiment of the disclosure, the second motion vector may be determined based on the distances between the first motion vector and the plurality of candidate prediction motion vectors without generating information about the second motion vector. Thus, a size of information transmitted to a decoding end may be reduced, and thus, compression efficiency may be improved.

According to an embodiment of the disclosure, when a first reference frame of the first motion vector is the same as a second reference frame of the plurality of candidate prediction motion vectors, the second motion vector may be a candidate prediction motion vector from among the plurality of candidate prediction motion vectors, the candidate prediction motion vector having a greatest distance from the first motion vector.

According to an embodiment of the disclosure, when the first reference frame of the first motion vector is the same as the second reference frame of the plurality of candidate prediction motion vectors, the distance may be identified by using an x component and a y component of each of the plurality of candidate prediction motion vectors and an x component and a y component of the first motion vector.

According to an embodiment of the disclosure, when the first reference frame of the first motion vector is different from the second reference frame of the plurality of candidate prediction motion vectors, the second motion vector may be a candidate prediction motion vector from among the plurality of candidate prediction motion vectors, the candidate prediction motion vector having a least distance from the first motion vector.

According to an embodiment of the disclosure, when the first reference frame of the first motion vector and the second reference frame of the plurality of candidate prediction motion vectors are different from each other, and a direction of the first reference frame and a direction of the second reference frame are the same as each other, the distance may be identified by scaling the plurality of candidate prediction motion vectors based on a POC of the first reference frame, a POC of each of the plurality of candidate prediction motion vectors, and a POC of the current block.

According to an embodiment of the disclosure, when the first reference frame of the first motion vector and the second reference frame of the plurality of candidate prediction motion vectors are different from each other, and the direction of the first reference frame and the direction of the second reference frame are different from each other, second candidate prediction motion vectors having a different direction from the first motion vector, from among the plurality of candidate prediction motion vectors, may be determined, and the distance may be identified by scaling the second candidate prediction motion vectors based on the POC of the first reference frame, a POC of each of the second candidate prediction motion vectors, and the POC of the current block.

According to an embodiment of the disclosure, when the plurality of candidate prediction motion vectors correspond to a plurality of second reference frames, the distance may be identified by scaling the second candidate prediction motion vectors based on the POC of the first reference frame, the POC of each of the second candidate prediction motion vectors, and the POC of the current block.

According to an embodiment of the disclosure, when the plurality of candidate prediction motion vectors correspond to the plurality of second reference frames, a third reference frame having a least distance from the first reference frame of the first motion vector may be determined from among the plurality of second reference frames, and the second motion vector may be determined based on a distance between each of a plurality of third candidate prediction motion vectors included in the third reference frame and the first motion vector.

According to an embodiment of the disclosure, when the plurality of candidate prediction motion vectors correspond to the plurality of second reference frames, the third reference frame having the least distance from the first reference frame of the first motion vector may be determined from among the plurality of second reference frames, and when the third reference frame includes one third candidate prediction motion vector, the third candidate prediction motion vector may be determined as the second motion vector.

According to the video encoding method according to an embodiment of the disclosure, the second motion vector may be determined according to a relationship between the first reference frame and the second reference frame without generating information about the second motion vector, and thus, the coding efficiency with respect to the current block may be improved.

A video encoding apparatus according to an embodiment of the disclosure may include: a memory storing one or more instructions; and at least one processor configured to operate according to the one or more instructions to: generate information about a first motion vector of a current block; determine the first motion vector based on the information about the first motion vector; determine a candidate list including a plurality of candidate prediction motion vectors for determining a second motion vector of the current block; determine one of the plurality of candidate prediction motion vectors as the second motion vector based on a distance between each of the plurality of candidate prediction motion vectors and the first motion vector; and encode the information about the first motion vector by determining a motion vector of the current block by using the first motion vector and the second motion vector.

According to the video encoding apparatus according to an embodiment of the disclosure, the second motion vector may be determined based on the distances between the first motion vector and the plurality of candidate prediction motion vectors without generating information about the second motion vector. Thus, a size of information transmitted to a decoding end may be reduced, and thus, compression efficiency may be improved.

According to an embodiment of the disclosure, when a first reference frame of the first motion vector is the same as a second reference frame of the plurality of candidate prediction motion vectors, the second motion vector may be a candidate prediction motion vector from among the plurality of candidate prediction motion vectors, the candidate prediction motion vector having a greatest distance from the first motion vector.

According to an embodiment of the disclosure, when the first reference frame of the first motion vector is the same as the second reference frame of the plurality of candidate prediction motion vectors, the distance may be identified by using an x component and a y component of each of the plurality of candidate prediction motion vectors and an x component and a y component of the first motion vector.

According to an embodiment of the disclosure, when the first reference frame of the first motion vector is different from the second reference frame of the plurality of candidate prediction motion vectors, the second motion vector may be a candidate prediction motion vector from among the plurality of candidate prediction motion vectors, the candidate prediction motion vector having a least distance from the first motion vector.

According to an embodiment of the disclosure, when the first reference frame of the first motion vector and the second reference frame of the plurality of candidate prediction motion vectors are different from each other, and a direction of the first reference frame and a direction of the second reference frame are the same as each other, the distance may be identified by scaling the plurality of candidate prediction motion vectors based on a POC of the first reference frame, a POC of each of the plurality of candidate prediction motion vectors, and a POC of the current block.

According to an embodiment of the disclosure, when the first reference frame of the first motion vector and the second reference frame of the plurality of candidate prediction motion vectors are different from each other, and the direction of the first reference frame and the direction of the second reference frame are different from each other, second candidate prediction motion vectors having a different direction from the first motion vector, from among the plurality of candidate prediction motion vectors, may be determined, and the distance may be identified by scaling the second candidate prediction motion vectors based on the POC of the first reference frame, a POC of each of the second candidate prediction motion vectors, and the POC of the current block.

According to an embodiment of the disclosure, when the plurality of candidate prediction motion vectors correspond to a plurality of second reference frames, the distance may be identified by scaling the second candidate prediction motion vectors based on the POC of the first reference frame, the POC of each of the second candidate prediction motion vectors, and the POC of the current block.

According to an embodiment of the disclosure, when the plurality of candidate prediction motion vectors correspond to the plurality of second reference frames, a third reference frame having a least distance from the first reference frame of the first motion vector may be determined from among the plurality of second reference frames, and the second motion vector may be determined based on a distance between each of a plurality of third candidate prediction motion vectors included in the third reference frame and the first motion vector.

According to an embodiment of the disclosure, when the plurality of candidate prediction motion vectors correspond to the plurality of second reference frames, the third reference frame having the least distance from the first reference frame of the first motion vector may be determined from among the plurality of second reference frames, and when the third reference frame includes one third candidate prediction motion vector, the third candidate prediction motion vector may be determined as the second motion vector.

According to the video encoding apparatus according to an embodiment of the disclosure, the second motion vector may be determined according to a relationship between the first reference frame and the second reference frame without generating information about the second motion vector, and thus, the coding efficiency with respect to the current block may be improved.

Machine-readable storage media may be provided as non-transitory storage media. Here, the term "non-transitory storage media" only denotes that the media are tangible and do not include a signal (for example, electromagnetic waves), and does not distinguish a case in which data is semi-permanently stored in the storage media and a case in which data is temporarily stored in the storage media. For example, "the non-transitory storage media" may include a buffer in which data is temporarily stored.

According to an embodiment of the disclosure, methods according to various embodiments of the disclosure described in this specification may be provided as an inclusion of a computer program product. The computer program product may be transacted between a seller and a purchaser as a product. The computer program product may be distributed in the form of a machine-readable storage medium (for example, a compact disc read-only memory (CD-ROM)), may be distributed through an application store, or may be directly distributed or distributed online (for example, downloaded or uploaded) between two user devices (for example, smartphones). In the case of the online distribution, at least part of the computer program product (for example, a downloadable application) may be at least temporarily stored or provisionally generated in machine-readable storage media, such as a server of a manufacturer, a server of an application store, or a memory of a broadcasting server.

The invention claimed is:

1. A video decoding method comprising:
obtaining, from a bitstream, information about a first motion vector of a current block;
determining, based on the information about the first motion vector, the first motion vector;
determining a candidate list including a plurality of candidate prediction motion vectors for determining a second motion vector of the current block;
determining, based on a distance between each of the plurality of candidate prediction motion vectors and the first motion vector, one of the plurality of candidate prediction motion vectors as the second motion vector; and
determining a motion vector of the current block by using the first motion vector and the second motion vector,
wherein, when a first reference frame of the first motion vector and a second reference frame of the plurality of candidate prediction motion vectors are same, the second motion vector is a candidate prediction motion vector having a greatest distance from the first motion vector, from among the plurality of candidate prediction motion vectors.

2. The video decoding method of claim 1, wherein, when the first reference frame of the first motion vector and the second reference frame of the plurality of candidate prediction motion vectors are same, the distance is identified by using an x component and a y component of each of the plurality of candidate prediction motion vectors and an x component and a y component of the first motion vector.

3. The video decoding method of claim 1, wherein, when the first reference frame of the first motion vector and the second reference frame of the plurality of candidate prediction motion vectors are different, the second motion vector is a candidate prediction motion vector having a least distance from the first motion vector, from among the plurality of candidate prediction motion vectors.

4. The video decoding method of claim 1, wherein, when the first reference frame of the first motion vector and the second reference frame of the plurality of candidate prediction motion vectors are different, and a direction of the first reference frame and a direction of the second reference frame are same, the distance is identified by scaling the plurality of candidate prediction motion vectors, based on a picture order count (POC) of the first reference frame, a POC of each of the plurality of candidate prediction motion vectors, and a POC of the current block.

5. The video decoding method of claim 1, wherein, when the first reference frame of the first motion vector and the second reference frame of the plurality of candidate prediction motion vectors are different, and a direction of the first reference frame and a direction of the second reference frame, from among the plurality of candidate prediction motion vectors are different, second candidate prediction motion vectors having a direction different from a direction of the first motion vector are determined, and
the distance is identified by scaling the second candidate prediction motion vectors, based on a POC of the first reference frame, a POC of each of the second candidate prediction motion vectors, and a POC of the current block.

6. The video decoding method of claim 1, wherein, when the plurality of candidate prediction motion vectors correspond to a plurality of second reference frames, the distance is identified by scaling second candidate prediction motion vectors, based on a POC of the first reference frame, a POC of each of the second candidate prediction motion vectors, and a POC of the current block.

7. The video decoding method of claim 1, wherein, when the plurality of candidate prediction motion vectors correspond to a plurality of second reference frames, a third reference frame having a least distance from the first reference frame of the first motion vector from among the plurality of second reference frames is determined, and
the second motion vector is determined based on a distance between the first motion vector and each of a plurality of third candidate prediction motion vectors included in the third reference frame.

8. The video decoding method of claim 1, wherein, when the plurality of candidate prediction motion vectors correspond to a plurality of second reference frames, a third reference frame having a least distance from the first reference frame of the first motion vector from among the plurality of second reference frames is determined, and
when there is one third candidate prediction motion vector included in the third reference frame, the one third candidate prediction motion vector is determined as the second motion vector.

9. A video decoding apparatus comprising:
a memory storing one or more instructions; and
at least one processor configured to operate according to the one or more instructions to:
obtain, from a bitstream, information about a first motion vector of a current block;
determine, based on the information about the first motion vector, the first motion vector;
determine a candidate list including a plurality of candidate prediction motion vectors for determining a second motion vector of the current block;
determine, based on a distance between each of the plurality of candidate prediction motion vectors and the first motion vector, one of the plurality of candidate prediction motion vectors as the second motion vector; and
determine a motion vector of the current block by using the first motion vector and the second motion vector,
wherein, when a first reference frame of the first motion vector and a second reference frame of the plurality of candidate prediction motion vectors are same, the second motion vector is a candidate prediction motion vector having a greatest distance from the first motion vector, from among the plurality of candidate prediction motion vectors.

10. The video decoding apparatus of claim 9, wherein, when the first reference frame of the first motion vector and the second reference frame of the plurality of candidate prediction motion vectors are different, the second motion vector is a candidate prediction motion vector having a least distance from the first motion vector, from among the plurality of candidate prediction motion vectors.

11. A video encoding method comprising:
generating information about a first motion vector of a current block;
determining the first motion vector, based on the information about the first motion vector;
determining a candidate list including a plurality of candidate prediction motion vectors for determining a second motion vector of the current block;
determining, based on a distance between each of the plurality of candidate prediction motion vectors and the first motion vector, one of the plurality of candidate prediction motion vectors as the second motion vector; and
encoding the information about the first motion vector by determining a motion vector of the current block by using the first motion vector and the second motion vector,
wherein, when a first reference frame of the first motion vector and a second reference frame of the plurality of candidate prediction motion vectors are same, the second motion vector is a candidate prediction motion vector having a greatest distance from the first motion vector, from among the plurality of candidate prediction motion vectors.

12. The video encoding method of claim 11, wherein, when the first reference frame of the first motion vector and the second reference frame of the plurality of candidate prediction motion vectors are different, the second motion vector is a candidate prediction motion vector having a least distance from the first motion vector, from among the plurality of candidate prediction motion vectors.

* * * * *